United States Patent
Kondo et al.

(10) Patent No.: US 6,201,833 B1
(45) Date of Patent: Mar. 13, 2001

(54) MOTION DETERMINING APPARATUS, METHOD THEREOF, AND PICTURE INFORMATION CONVERTING APPARATUS

(75) Inventors: Tetsujiro Kondo, Tokyo; Yasushi Tatehira, Kanagawa; Masashi Uchida; Nobuyuki Asakura, both of Tokyo; Takuo Morimura, Kanagawa; Kazutaka Ando, Kanagawa; Hideo Nakaya, Kanagawa; Tsutomu Watanabe, Kanagawa; Satoshi Inoue, Kanagawa; Wataru Niitsuma, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/371,356

(22) Filed: Aug. 10, 1999

(30) Foreign Application Priority Data

Aug. 12, 1998 (JP) .................................................. 10-228221

(51) Int. Cl.$^7$ .............................. H04N 7/12; H04N 7/36
(52) U.S. Cl. .................................. 375/240.12; 348/401.1; 348/699
(58) Field of Search ................................ 348/401.1, 457, 348/699, 700, 702; 375/240.01, 240.04, 240.12; H04N 7/12, 7/36

(56) References Cited

U.S. PATENT DOCUMENTS

| | | | |
|---|---|---|---|
| 4,651,211 | * 3/1987 | Weckenbrock et al. | 348/702 |
| 4,837,618 | * 6/1989 | Hatori et al. | 348/401.1 |
| 5,049,990 | 9/1991 | Kondo et al. . | |
| 5,142,362 | * 8/1992 | Masera et al. | 348/700 |
| 5,418,569 | * 5/1995 | Ando | 375/240.12 |
| 5,497,203 | * 3/1996 | Kayashima et al. | 348/699 |
| 5,515,114 | * 5/1996 | Murata | 348/420.1 |
| 5,903,481 | 5/1999 | Kondo et al. . | |

\* cited by examiner

Primary Examiner—Howard Britton
Assistant Examiner—Nhon T Diep
(74) Attorney, Agent, or Firm—Frommer Lawrence & Haug, LLP.; William S. Frommer (57) ABSTRACT

A motion determining apparatus for detecting a motion of a partial picture of an input picture signal is disclosed, that comprises a first detecting means for detecting a frame difference of the partial picture, a second detecting means for detecting a spatial activity of the partial picture, a threshold value generating means for generating a first threshold value, a second threshold value, and a third threshold value, a comparing means having at least a first comparing portion for comparing the frame difference detected by said first detecting means with the first threshold value and a second comparing portion for comparing the frame difference detected by said first detecting means with the second threshold value, a third comparing means for comparing the spatial activity detected by said second detecting means with the third threshold value, and a motion class determining means for receiving the compared results of said first comparing portion, said second comparing portion, and said third comparing means and determining the motion of the partial picture in at least three levels.

9 Claims, 11 Drawing Sheets

| LV3 | LV2 | LV1 | MJ |
|-----|-----|-----|-----|
| 1 | 1 | 1 | 3 |
| 1 | 1 | 0 | 3 |
| 1 | 0 | 1 | 3 |
| 1 | 0 | 0 | 3 |
| 0 | 1 | 1 | 2 |
| 0 | 1 | 0 | 2 |
| 0 | 0 | 1 | 1 |
| 0 | 0 | 0 | 0 |

|        | INTRA-FIELD   | INTER-FRAME         |
|--------|---------------|---------------------|
| MODE 0 | P0            | P0           Pa     |
| MODE 1 | P0,P1         | P0,P1        Pb     |
| MODE 2 | P0,P1,P2      | P0,P1,P2     Pb,Pc  |
| MODE 3 | P0,P1,P2,P3   | P0,P1,P2,P3  Pb,Pc  |

Fig. 8

| CD3 | CD2 | CD1 | MD |
|-----|-----|-----|----|
| 1   | 1   | 1   | 3  |
| 1   | 1   | 0   | 3  |
| 1   | 0   | 1   | 3  |
| 1   | 0   | 0   | 3  |
| 0   | 1   | 1   | 2  |
| 0   | 1   | 0   | 2  |
| 0   | 0   | 1   | 1  |
| 0   | 0   | 0   | 0  |

MOTION DETERMINING APPARATUS, METHOD THEREOF, AND PICTURE INFORMATION CONVERTING APPARATUS

BACKGROUND OF THE INVENTION

1. Field of the Invention

The present invention relates to a motion determining apparatus, a motion determining method, and a picture information converting apparatus.

2. Description of the Related Art

In a picture signal converting apparatus that converts an input digital picture signal into a picture signal with a different scanning line structure or in a picture process using a highly efficient code for compressing a digital picture signal, a motion determining process for determining whether or not a considered portion of a picture has a motion is used. In a conventional motion determining apparatus, the sum of the absolute values of differences between a picture portion (for example, a block) of one frame and the same picture portion of an adjacent frame. When the sum is equal to or larger than a predetermined threshold value, it is determined that the picture portion has a motion. In contrast, when the sum is smaller than the predetermined threshold value, it is determined that the picture portion does not have a motion.

However, in the conventional motion determining process, since it is determined whether a picture is a moving picture or a still picture, at the boundary of a picture portion that has been processed as a still picture and another picture portion that has been processed as a moving picture, there is a remarkable difference in the picture quality. In addition, when the motion determining process is performed with only a frame difference, an incorrect result may be obtained. In other words, even if a frame difference of a picture is large, if there is a large intra-field activity, the picture may be close to a still picture. In contrast, even if a frame difference of a picture is small, if there is no intra-field activity, the picture may be close to a moving picture. As a motion determining method using the fact that the relation between a frame difference and an intra-field activity is linear, slope method is known. However, in the slope method, the motion determining process cannot be flexibly performed corresponding to the value of the intra-field activity.

OBJECTS AND SUMMARY OF THE INVENTION

Therefore, an object of the present invention is to provide a motion determining apparatus, a motion determining method, and a picture information converting apparatus that suppress the probability of occurrences of errors in the motion determining process and allow a plurality of stages of determined results to be obtained.

A first aspect of the present invention is a motion determining apparatus for detecting a motion of a partial picture of an input picture signal, comprising a first detecting means for detecting a frame difference of the partial picture, a second detecting means for detecting a spatial activity of the partial picture, a threshold value generating means for generating a first threshold value, a second threshold value, and a third threshold value, a comparing means having at least a first comparing portion for comparing the frame difference detected by said first detecting means with the first threshold value and a second comparing portion for comparing the frame difference detected by said first detecting means with the second threshold value, a third comparing means for comparing the spatial activity detected by said second detecting means with the third threshold value, and a motion class determining means for receiving the compared results of said first comparing portion, said second comparing portion, and said third comparing means and determining the motion of the partial picture in at least three levels.

A second aspect of the present invention is a motion determining method for detecting a motion of a partial picture of an input picture signal, comprising the steps of (a) detecting a frame difference of the partial picture, (b) detecting a spatial activity of the partial picture, (c) generating a first threshold value, a second threshold value, and a third threshold value, (d) comparing the frame difference detected by at step (a) with at least the first threshold value and the second threshold value, (e) comparing the spatial activity detected by step (b) with the third threshold value, and (f) receiving the compared results obtained at steps (d) and (e) and determining the motion of the partial picture in at least three levels.

A third aspect of the present invention is a picture information converting apparatus for converting an input picture signal into a plurality of output picture signals with different scanning line structures, comprising a first data selecting means for selecting a plurality of first pixels of the input picture signal, the positions of the first pixels being present in the vicinity of pixels of an output picture signal to be generated, a second data selecting means for selecting a plurality of second pixels of the input picture signal, the positions of the second pixels being present in the vicinity of pixels of an output picture signal to be generated, a third data selecting means for selecting a plurality of third pixels of the input picture signal, the positions of the third pixels being present in the vicinity of pixels of an output picture signal to be generated, a memory means for storing pre-obtained estimation expression coefficients, a signal generating means for generating pixels of an output picture signal with the plurality of first pixels selected by said first data selecting means and a linear estimation expression of the estimation expression coefficients, a class determining means for forming a spatial class corresponding to the plurality of second pixels selected by said second data selecting means, forming a motion class corresponding to the plurality of third pixels selected by said third data selecting means, and supplying the estimation coefficients to said signal generating means corresponding to class information as a combination of the spatial class and the motion class, a scanning line structure converting means, connected to said signal generating means, for converting the input picture signal into an output picture signal with a designated scanning line structure, and a motion determining portion for forming the motion class, wherein said motion determining portion has a first detecting means for detecting a frame difference of the partial picture composed of the plurality of third pixels, a second detecting means for detecting a spatial activity of the partial picture, a threshold value generating means for generating a first threshold value, a second threshold value, and a third threshold value, a comparing means having at least a first comparing portion for comparing the frame difference detected by said first detecting means with the first threshold value and a second comparing portion for comparing the frame difference detected by said first detecting means with the second threshold value, a third comparing means for comparing the spatial activity detected by said second detecting means with the third threshold value, and a motion class determining means for receiving the compared results of said first comparing portion, said second comparing portion, and said third comparing means and determining the motion of the partial picture in at least three levels.

According to the present invention, since a motion determining process is performed using a spatial activity as well as a frame difference, an accurate result can be obtained. Even if a frame difference is large, since an intra-field activity is large, a picture close to a still picture can be detected. In addition, even if a frame difference is small, when there is no activity, information close to a moving picture can be detected. Moreover, since a motion of a picture is determined in three or more levels rather than two levels of a moving picture and a still picture, when a picture is processed corresponding to the motion determining process, the resultant picture can be prevented from becoming unnatural.

In the picture information converting apparatus according to the present invention, classes are detected with a plurality of pixels of an input picture signal. Pixel values are generated with estimation prediction expressions optimum in the individual classes. Thus, the picture quality of a still picture and a moving picture obtained by the picture information converting apparatus according to the present invention is higher than those of a conventional picture information converting apparatus. In addition, since motion information is contained in class information, it is not necessary to determine whether the current picture is a still picture or a moving picture. In addition, it is not necessary to perform a switching operation for a still picture and a moving picture. Thus, the difference of the picture quality between a still picture and a moving picture can be prevented from becoming conspicuous. In addition, the deterioration of the picture quality due to an incorrectly detected result can be remarkably suppressed.

As prior art references of the present invention, the following patent application was filed by the applicant of the present invention and the following USP was granted thereto.

(1) Japanese Patent Application No. H09-115437 (US patent application corresponding thereto is now pending), and (2) U.S. Pat. No. 5,049,990

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENT

Figure 1:
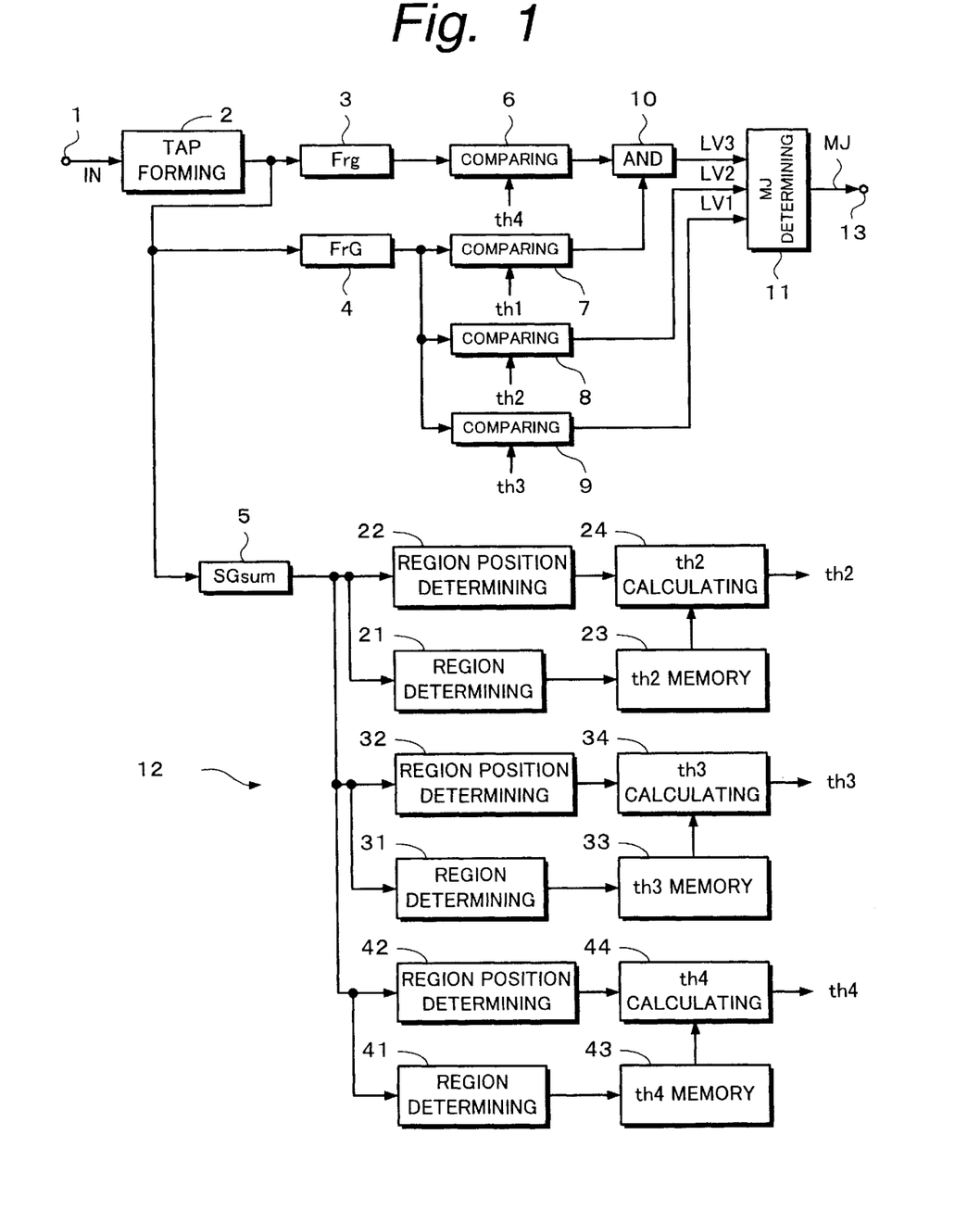
FIG. 1 is a partial block diagram showing the structure of a first portion of a motion determining apparatus according to an embodiment of the present invention.
Figure 2:
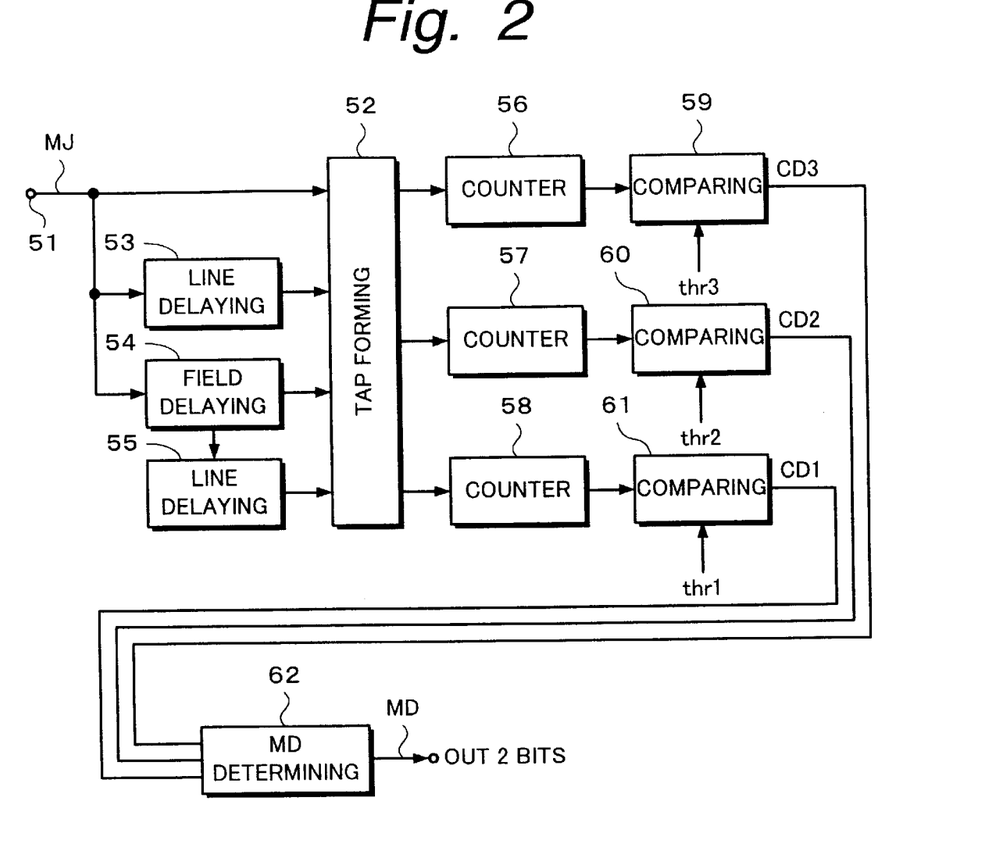
FIG. 2 is a partial block diagram showing the structure of a second portion of a motion determining apparatus according to the embodiment of the present invention.

Next, with reference to the accompanying drawings, an embodiment of the present invention will be described. FIGS. 1 and 2 show the structures of a first portion and a second portion of a motion determining apparatus according to the present invention. FIG. 1 shows the structure of a first portion that generates a motion class MJ with an input digital picture signal. FIG. 2 shows the structure of the second portion that performs a majority determining process with a motion class MJ so as to generate a final motion class MD. The motion determining apparatus according to the present invention is composed of the first portion shown in FIG. 1 and the second portion shown in FIG. 2. The first portion shown in FIG. 1 and the second portion shown in FIG. 2 are connected in series.

Figure 3:
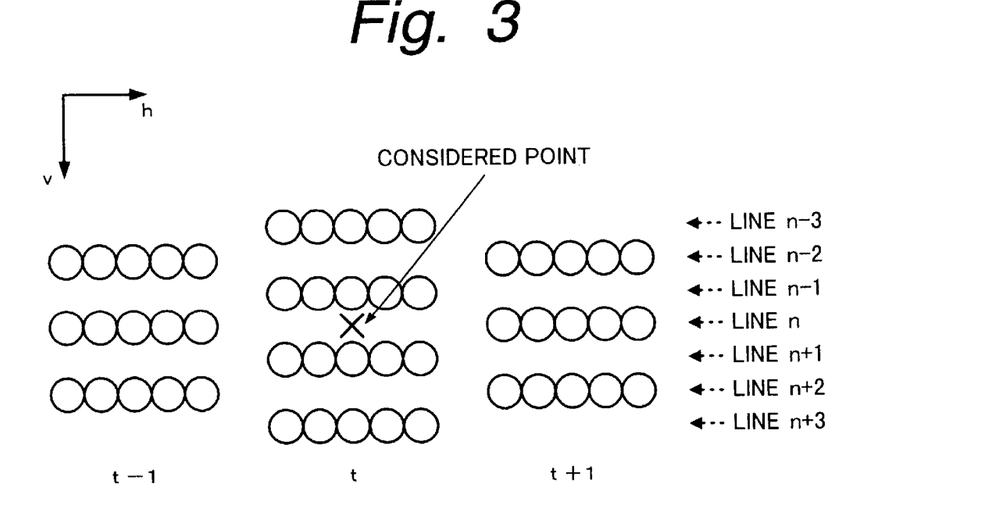
FIG. 3 is a schematic diagram showing taps used for a motion determining process according to the embodiment of the present invention.

Next, the first portion shown in FIG. 1 will be described. Referring to FIG. 1, an input digital picture signal is received from an input terminal 1 and supplied to a tap forming circuit 2. In this example, the input digital picture signal is an interlace signal. The tap forming circuit 2 selects 50 pixels shown in FIG. 3 as taps used for a motion determining process and outputs the selected taps. FIG. 3 shows pictures of the same spatial position of three fields at chronologically successive times t−1, t, and t+1. Dots in FIG. 3 represent pixels sampled at a predetermined frequency. For example, one pixel is represented with an eight-bit luminance value.

In the field at time t−1, five taps at the same position are selected from each of three lines that are chronologically successive. Likewise, in the field at time t+1, five taps of the same position are selected from each of three lines that are chronologically successive. The spatial positions of taps of these fields are the same. In the field at time t (current field), five taps of the same position are selected from each of four lines that are chronologically successive. Because of the interlace system, the four lines of the field at time t spatially deviate by one line from the taps of the fields at times t−1 and t+1. In FIG. 3, a position denoted by x represents a considered point With respect to the considered point, the motion determining process is performed.

The tap forming circuit 2 is connected to a dynamic range DR detecting circuit 3, a frame difference FrG detecting circuit 4, and a space slope SGsum detecting circuit 5. A comparing device 6 is connected to the dynamic range DR detecting circuit 3. The comparing device 6 compares the dynamic range DR with a threshold value th4. Comparing devices 7, 8, and 9 are connected to the frame difference FrG detecting circuit 4. The comparing device 7 compares a frame difference FrG with a threshold value th1. The comparing device 8 compares the frame difference FrG with a threshold value th2. The comparing device 9 compares the frame difference FrG with a threshold value th3.

When the input value (DR) of the comparing device 6 is equal to or larger than the threshold value (th4), the comparing device 6 outputs "1". Otherwise, the comparing device 6 outputs "0". When the input value (FrG) of the comparing device 7 is equal to or larger than the threshold value (th1), the comparing device 7 outputs "1". Otherwise, the comparing device 7 outputs "0". When the input value (FrG) of the comparing device 8 is equal to or larger than the threshold value (th2), the comparing device 8 outputs "1". Otherwise, the comparing device 8 outputs "0". When the input value (FrG) of the comparing device 9 is equal to or larger than the threshold value (th3), the comparing device 9 outputs "1". Otherwise, the comparing device 9 outputs "0". Thus, when FrG≧th1, the comparing device 7 outputs "1". When FrG<th1, the comparing device 7 outputs "0". A threshold value generating portion 12 is connected to the space slope SGsum detecting circuit 5. The operation of the threshold value generating portion 12 will be described later.

The dynamic range DR is an example of a spatial activity. The difference between the maximum value MAX and the minimum value MIN of the pixel values of 50 taps received from the tap forming circuit 2 is defined as the dynamic range DR. In other words, the following relation is satisfied.

$$DR=MAX-MIN$$

The threshold value th4 is used to determine the value of the dynamic range DR.

The frame difference FrG is obtained by calculating the differences between the pixel values of 15 taps of the field at time t−1 and the pixel values of 15 taps of the field at time t+1 (the spatial positions of the 15 taps of the field at time t−1 are the same as the spatial positions of the 15 taps of the field at time t+1), converting the obtained 15 frame differences into the absolute values, and adding the absolute values. Generally, the amount of the motion between adjacent frames is proportional to the value of the frame difference FrG.

The space slope SGsum is the sum of the space slope SG(t−1) of the field at time t−1, the space slope SG(t) of the field at time t, and the space slope SG(t+1) of the field at time t+1. As with the dynamic range DR, these space slopes are also apace activities. The space slope of each field is obtained by calculating the differences between pixels of adjacent fields and adding the absolute values of the differences. In the case of a particular pixel at the upper left corder of the field at time t−1, the pixel immediately below the particular pixel and the pixel on the right of the particular pixel are adjacent pixels. The difference between the pixel value of the particular pixel and the pixel value of each of the adjacent pixels is calculated. Likewise, the difference between the pixel value of a particular pixel and each of vertical and horizontal adjacent pixels is calculated. By adding the differences of the 15 pixels, the space slope SG(t−1) of the field at time t−1 is obtained. Likewise, the space slope SG(t) of the field at time t and the space slope SG(t+1) of the field at time t+1 are obtained.

The compared results of the comparing devices 6 and 7 are supplied to an AND gate 10. Output data LV3 of the AND gate 10 is supplied to a motion class MJ determining portion 11. Output data LV2 of the comparing device 8 and output data LV3 of the comparing device 9 are supplied to the motion class MJ determining portion 11. The MJ determining portion 11 inputs the data LV1, LV2, and LV3 and outputs a two-bit motion class MJ. The value of the motion class MJ is one of 0, 1, 2, and 3. When the motion class MJ is 3, the motion of a considered point is the largest.

Figure 4:
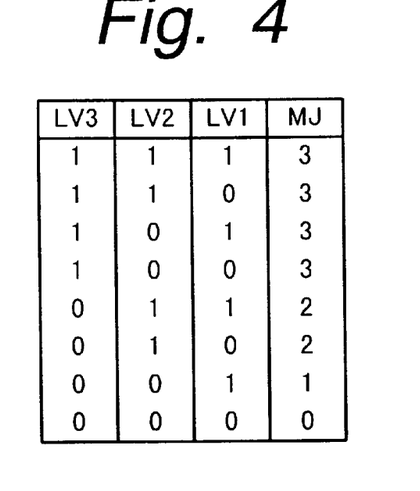
FIG. 4 is a table showing a logic for determining a motion class MJ according to the embodiment of the present invention.

The motion class MJ determining portion 11 determines the motion class MJ corresponding to the following conditions and outputs the determined motion class MJ to an output terminal 13. FIG. 4 is a table showing a logic for determining the motion class MJ with the data LV1, LV2, and LV3.

Motion class $MJ=3$: $FrG \geq th1$ AND $DR \geq th4$ ($LV3=$"1")

Motion class $MJ=2$: $FrG \geq th2$ ($LV2=$"1") AND $LV3=$"0"

Motion class $MJ=1$: $FrG \geq th3$ ($LV1=$"1") AND $LV3=$"0" AND $LV2=$"0"

Motion class $MJ=0$: Except for above conditions ($LV3=LV2=LV1=$"0")

Figure 5:
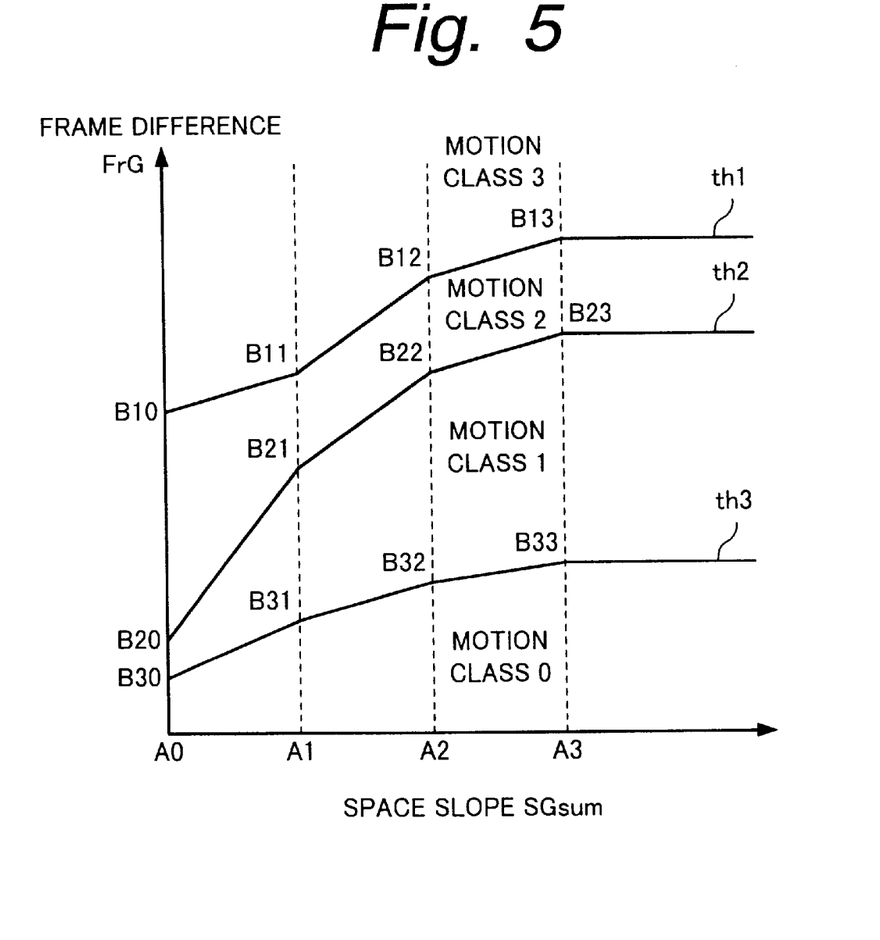
FIG. 5 is a graph for explaining threshold values according to the embodiment of the present invention.

As shown in FIG. 5, the threshold value generating portion 12 generates the threshold values th1, th2, and th3 that vary corresponding to the value of the space slope SGsum. Although the threshold values independently vary, they are proportional to the space slope SGsum. The generated threshold values th1, th2, and th3 are supplied to the comparing devices 7, 8, and 9, respectively. The comparing devices 7, 8, and 9 compare the threshold values th1, th2, and th3 with the frame difference FrG, respectively. Thus, corresponding to the above-described conditions, four types of motion classes MJ are determined as shown in FIG. 5.

To generate the threshold value th1, a region determining circuit 21, a region position determining circuit 22, a memory 23, and a th1 calculating circuit 24 are disposed. The space slope SGsum is supplied to the region determining circuit 21 and the region position determining circuit 22. The memory 23 outputs a parameter corresponding to output data of the region determining circuit 21. The th1 calculating circuit 24 receives output data of the region position determining circuit 22 and the parameter that is output from the memory 23 and generates the threshold value th1. As shown in FIG. 5, four regions are defined by values represented by A0, A1, A2, and A3 of the space slope SGsum. The three regions (A0–A1), (A1–A2), and (A2–A3) have the same width. In a region of SGsum>A3, it is assumed that the threshold values th2th3, and th4 are saturated. The region determining circuit 21 determines one of the four regions.

In addition, threshold value levels B10, B11, B12, and B13 are defined corresponding to the values A0, A1, A2, and A3 of the space slope SGsum, respectively. These levels are output from the memory 23. In the region (A0–A1), the levels B10 and B11 are output from the memory 23 to the threshold value calculating circuit 24. Each of the three regions is equally divided by for example 64. The region position determining circuit 22 determines a position in a region. When the region position determining circuit 22 has determined a position in a region, the threshold value calculating circuit 24 performs a linear interpolating process and generates the threshold value th1. For example, at a position in the region (A0–A1), a coefficient corresponding to the position is multiplied by the levels B10 and B11 and the calculated results are added. Thus, the threshold value th1 is obtained.

To generate the threshold value th2, a region determining circuit 31, a region position determining circuit 32, a memory 33, and a calculating circuit 34 are disposed. To generate the threshold value th3, a region determining circuit 41, a region position determining circuit 42, a memory 43, and a calculating circuit 44 are disposed. These structures operate in the same manner as the structure for generating the threshold value th1. However, the memory 34 stores levels B20, B21, B22, and B23 of the threshold value th2. The memory 44 stores levels B30, B31, B32, and B33 of the threshold value th3.

Motion classes MJ that have been determined in the first portion shown in FIG. 1 are supplied to the second portion shown in FIG. 2. The second portion shown in FIG. 2 performs a majority determining process. The majority determining process is performed so as to remove isolated points of motion classes and coordinate the motion class of a considered point with those at points adjacent thereto. When the majority determining process is added, the picture quality of the output picture can be prevented from deteriorating. A tap forming circuit 52 forms taps necessary for performing the majority determining process with an input motion class, a motion class of one line prior received from a line delaying circuit 53, a motion class of one field prior received from a field delaying circuit 54, and a motion class of one field prior and one line prior received from a line delaying circuit 55 through the field delaying circuit 54.

Figure 6:
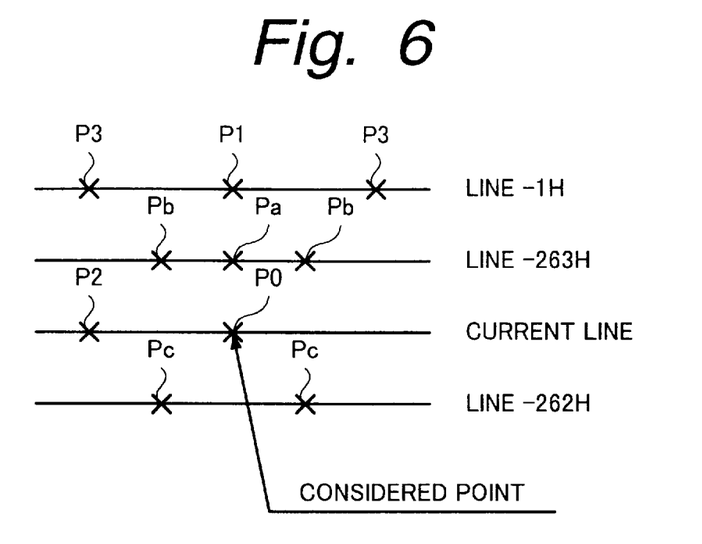
FIG. 6 is a schematic diagram showing taps used in a majority determining process for determining a motion class according to the embodiment of the present invention.

FIG. 6 shows an example of a plurality of taps present in the vicinity of a considered point PO as an object for the majority determining process. In other words, each tap corresponds to the position of the considered point against pixels of an input digital picture signal (see FIG. 3). FIG. 6 shows a line of the same field that is spatially upper by one line than the current line of the considered point PO (line −1H), a line of the preceding field that is spatially upper by one line than the current line (line −263H), and a line of the preceding field that is spatially lower by one line than the current line (line −262H).

In this case, a tap P1 on the line −1H and vertically adjacent to the considered point PO is selected. A tap Pa on the line −263H and vertically adjacent to the considered point PO is selected. Two taps Pb on the right and left of the tap Pa are selected. Two taps P3 on the left and right of the tap P1 and spaced apart therefrom by one tap are selected. A tap P2 on the left of the tap P0 and spaced apart therefrom by one tap is selected. Two taps Pc on the left and right of the tap immediately below the tap PO are selected. Thus, a total of 10 taps are selected.

Figure 7:
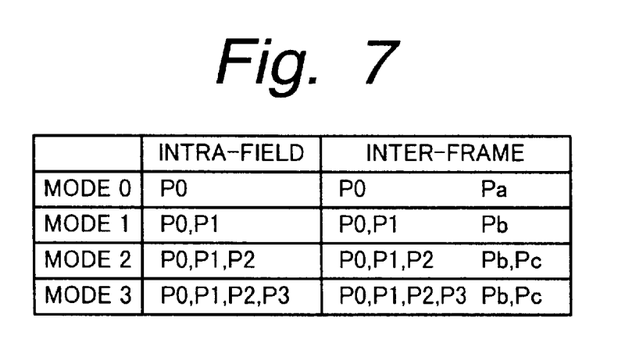
FIG. 7 is a table showing modes of the majority determining process according to the embodiment of the present invention.

The tap forming circuit 52 selects taps used for the majority determining process from those shown in FIG. 6 corresponding to a mode. The mode is selected by the user corresponding to the pattern of the picture, the amount of motion of the picture, and so forth of the input digital picture signal. FIG. 7 lists mode types and taps selected therein. Referring to FIG. 7, one of four modes that are mode 1, mode 2, mode 3, and mode 4 and one of intra-field process and inter-frame process are set. Thus, there are eight combinations of taps to be selected.

In the mode 0 as the simplest mode, when the intra-field process is performed, only the tap PO as the considered point is used. In the mode 0, when the inter-frame process is performed, the taps P0 and P1 are used. In the mode 3 as the most complicated mode, when the intra-field process is performed, five taps P0, P1, P2, and P3 (two taps) are used. In the mode 3, when the inter-frame process is performed, nine taps P0, P1, P2, P3 (two taps), Pb (two taps), and Pc (two taps) are used.

Returning to FIG. 2, the tap forming circuit 52 outputs motion classes of taps corresponding to individual modes. A counter 56 counts the number of taps of the motion class 3. A counter 57 counts the number of taps of the motion class 2. A counter 58 counts the number of taps of the motion class 1. The count values of the counters 56, 57, and 58 are supplied to comparing devices 59, 60, and 61, respectively.

The comparing device 59 compares the count value of the motion class 3 counted by the counter 56 with a threshold value thr3. The comparing device 60 compares the count value of the motion class 2 counted by the counter 57 with a threshold value thr2. The comparing device 61 compares the count value of the motion class 1 counted by the counter 58 with a threshold value thr1. The comparing devices 59, 60, and 61 generate compared results CD3, CD2, and CD1. When the count value counted by the counter 56 is equal to or larger than the threshold value thr3, the compared result CD3 is "1". Otherwise, the compared result CD3 is "0". When the count value counted by the counter 57 is equal to or larger than the threshold value thr2, the compared result CD2 is "1". Otherwise, the compared result CD2 is "0". When the count value counted by the counter 58 is equal to or larger than the threshold value thr1, the compared result CD1 is "1". Otherwise, the compared result CD1 is "0". The compared results CD3, CD2, and CD1 of the comparing devices 59, 60, and 61 are supplied to a motion class MD determining portion 62. The motion class determining portion 62 receives the compared results CD3, CD2, and CD1 and determines a final motion class MD.

Figure 8:
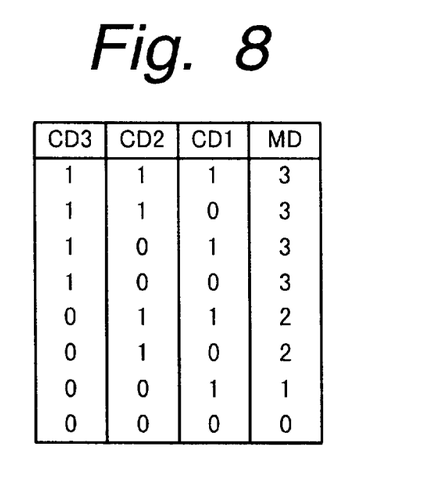
FIG. 8 is a table showing a logic for determining a motion class MD according to the embodiment of the present invention.

FIG. 8 lists a logic of which the motion class determining portion 62 determines a class. When the compared result CD3 is "1", the motion class determining portion 62 determines that the motion class MD is 3. When the compared result CD3 is "0" and the compared result CD2 is "1", the motion class determining portion 62 determines that the motion class MD is 2. When the compared result CD3 is "0", the compared result CD2 is "0", and the compared result CD1 is "1", the motion class determining portion 62 determines that the motion class MD is 1. When the compared result CD3 is "0", the compared result CD2 is "0", and the compared result CD1 is "0", the motion class determining portion 62 determines that the motion class MD is 0. In this example, the threshold values thr1, thr2, and thr3 are fixed values that are properly designated.

Figure 9:
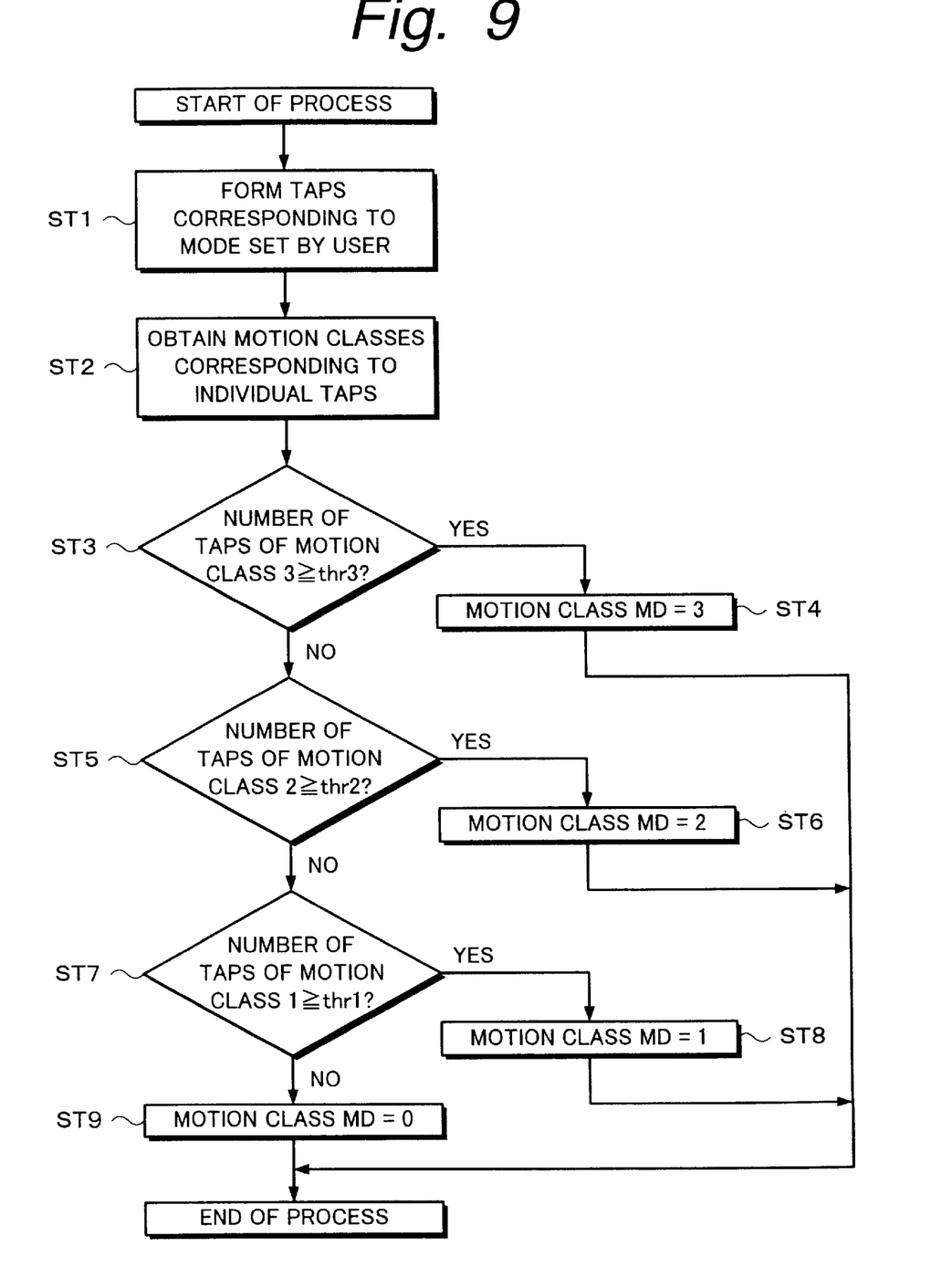
FIG. 9 is a flow chart showing the majority determining process according to the embodiment of the present invention.

Next, with reference to a flow chart shown in FIG. 9, the majority determining process performed by software will be described. After the motion class MJ has been determined, at step ST1, taps corresponding to a selected mode are formed. At step ST2, motion classes for the individual taps are obtained. At step ST3, it is determined whether or not the number of taps of the motion class 3 is equal to or larger than the threshold value thr3. When the determined result at step ST3 is Yes, the flow advances to step ST4. At step ST4, it is determined that the final motion class MD is 3.

When the determined result at step ST3 is No, the flow advances to step ST5. At step ST5, it is determined whether or not the number of taps of the motion class 2 is equal to or larger than the threshold value thr2. When the determined result at step ST5 is Yes, the flow advances to step ST6. At step ST6, it is determined that the final motion class MD is 2. When the determined result at step ST5 is No, the flow advances to step ST7. At step ST7, it is determined whether or not the number of taps of the motion class 1 is equal to or larger than the threshold value thr1. When the determined result at step ST7 is Yes, the flow advances to step ST8. At step ST8, it is determined that the final motion class MD is 1. When the determined result at step ST7 is No, it is determined that the final motion class is 0. Thereafter, the majority determining process is completed.

Figure 10:
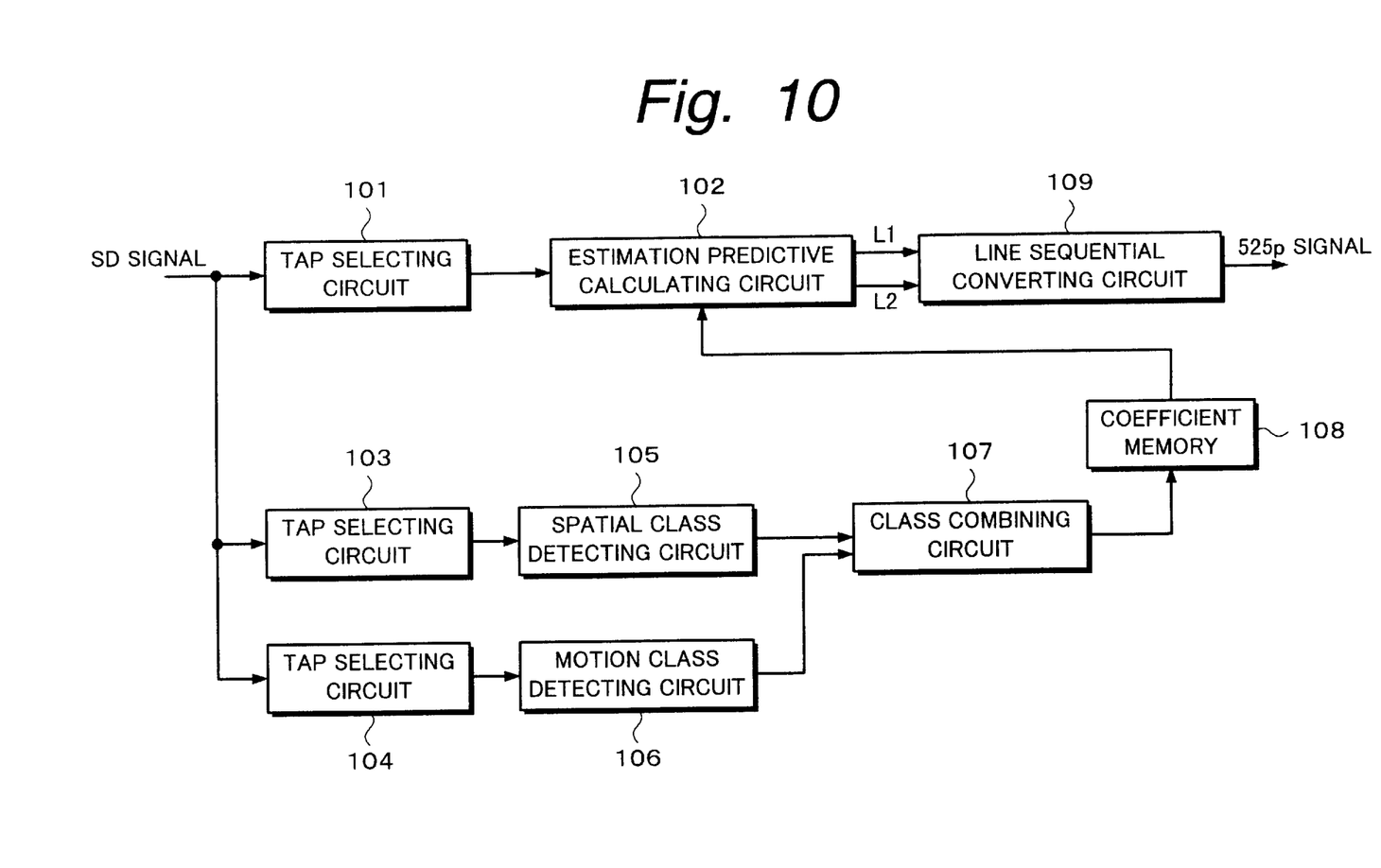
FIG. 10 is a block diagram showing an example of the structure of the picture information converting apparatus according to the present invention.

The motion determining apparatus according to the present invention can be applied for a motion class generating process of a picture signal converting apparatus. The picture signal converting apparatus inputs an SD (Standard Definition) signal and outputs an HD (High Definition) signal. When HD pixels are generated, SD pixels present in the vicinity thereof are categorized as classes. For each class, a predictive coefficient value is obtained. In such a manner, HD pixels more closer to real values can be obtained. FIG. 10 shows the structure of the picture signal converting apparatus that performs such a method.

In FIG. 10, an input SD signal (525$i$ signal) is supplied to a first tap selecting circuit 101, a second tap selecting circuit 103, and a third tap selecting circuit 104. The first tap selecting circuit 101 selects SD pixels that are used for predicting HD pixels (the SD pixels are referred to as predictive taps). The second tap selecting circuit 103 selects SD pixels used to categorize classes corresponding to a distribution pattern of levels of SD pixels present in the vicinity of HD pixels to be generated (hereinafter, the SD pixels are referred to as spatial class taps). The third tap selecting circuit 104 selects SD pixels used to categorize classes of motion corresponding to SD pixels present in the vicinity of HD pixels to be generated (hereinafter the SD pixels are referred to as motion class taps).

Predictive taps selected by the first tap selecting circuit 101 are supplied to an estimation predictive calculating circuit 102. Spatial class taps selected by the second tap selecting circuit 103 are supplied to a spatial class detecting circuit 105. The spatial class detecting circuit 105 detects a spatial class. The detected spatial class is supplied to a class combining circuit 107. Motion class taps selected by the third tap selecting circuit 104 are supplied to a motion class detecting circuit 106. The motion class detecting circuit 106 detects a motion class. The detected motion class is supplied to a class combining circuit 107. The class combining circuit 107 combines the spatial class and the motion class and generates a final class code.

The class code is supplied as an address to a coefficient memory 108. Coefficient data corresponding to the class code is read from the coefficient memory 108. The coefficient data and the predictive taps are supplied to the estimation predictive calculating circuit 102. The estimation predictive calculating circuit 102 calculates data of an output picture signal (525$p$ signal) corresponding to a linear estimation expression of the predictive taps (pixels of the 525$i$ signal) and the predictive coefficients. The estimation predictive calculating circuit 102 outputs data of the current line (this data is referred to as line data L1) and data of a line to be generated (this data is referred to as line data L2). In addition, the estimation predictive calculating circuit 102 outputs pixels in the vertical direction twice as many as those in the horizontal direction. The 525$i$ signal represents an interlace signal with 525 scanning lines. The 525$p$ signal represents a progressive signal (non-interlace signal) with 525 scanning lines.

The line data L1 and L2 received from the estimation predictive calculating circuit 102 are supplied to a line sequential converting circuit 109. The line sequential converting circuit 109 performs a line double speed process. Since the estimation predictive calculating circuit 102 generates the 525$p$ signal with the 525$i$ signal, the horizontal period of the 525$p$ signal is the same as the horizontal period of the 525$i$ signal. The line sequential converting circuit 109 performs a line double speed process for doubling the horizontal interval. The line sequential converting circuit 109 outputs the 525$p$ signal.

Figure 11:
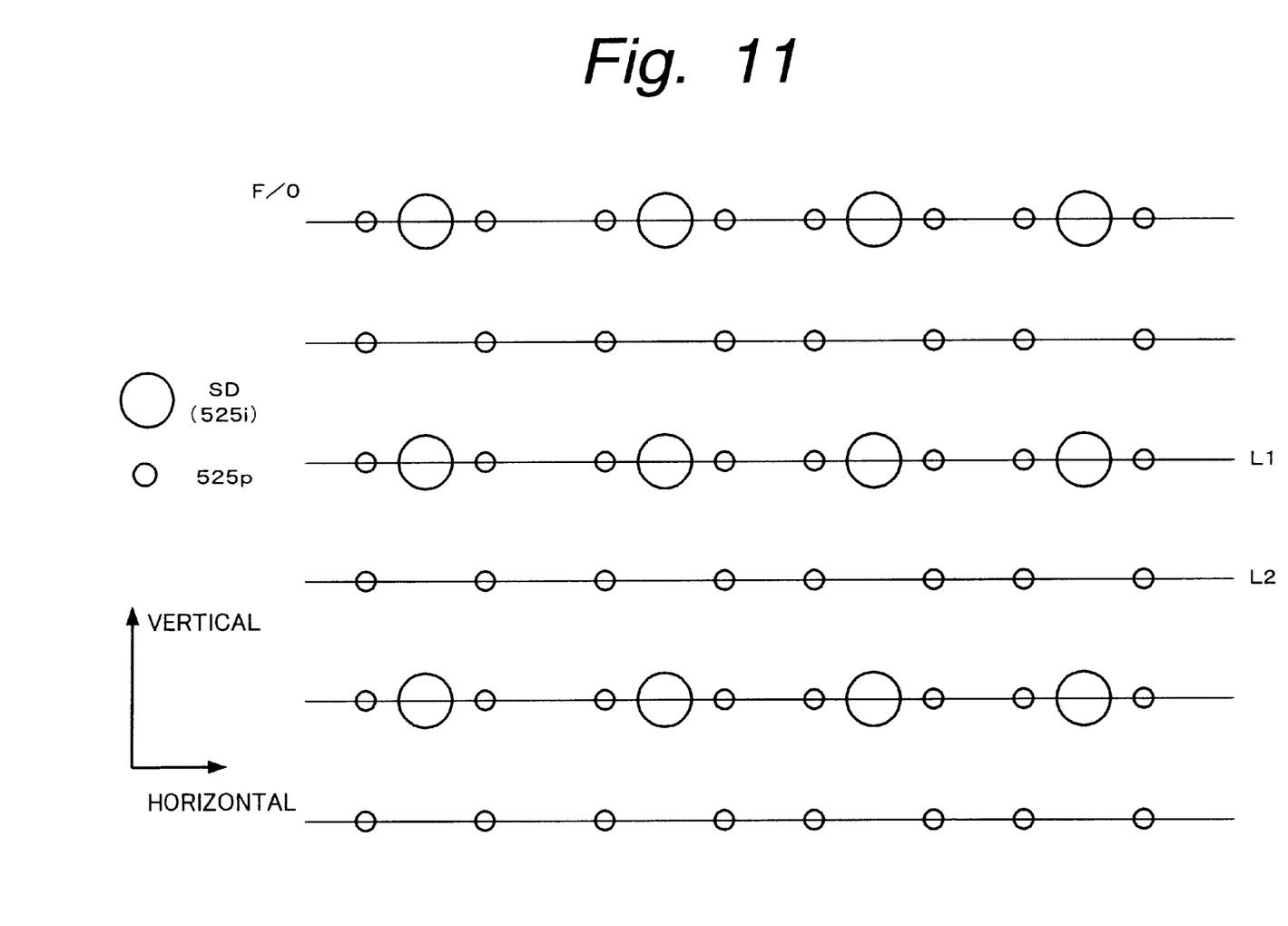
FIG. 11 is a schematic diagram for explaining the relation of positions of SD pixels and 525$p$ pixels.

FIG. 11 is an enlarged view of a part of a picture of one field. FIG. 11 shows an arrangement of pixels of a 525$i$ signal and a 525$p$ signal. In FIG. 11, large dots represent pixels of the 525$i$ signal, whereas small dots represent pixels of the 525$p$ signal. This relation applies to the other drawings. FIG. 10 shows an arrangement of pixels of an odd field (o) of a particular frame (F). In the other field (even field), lines of the 525$i$ signal spatially deviate by 0.5 lines each. As is clear from FIG. 10, line data L1 at the same position of each line of the 525$i$ signal and line data L2 at the center position of the upper and lower lines thereof are generated. The number of pixels of each line in the horizontal direction is twice as many as that in the vertical direction. Consequently, the estimation predictive calculating circuit 102 generates data of four pixels of the 525$p$ signal at a time.

Figure 12:
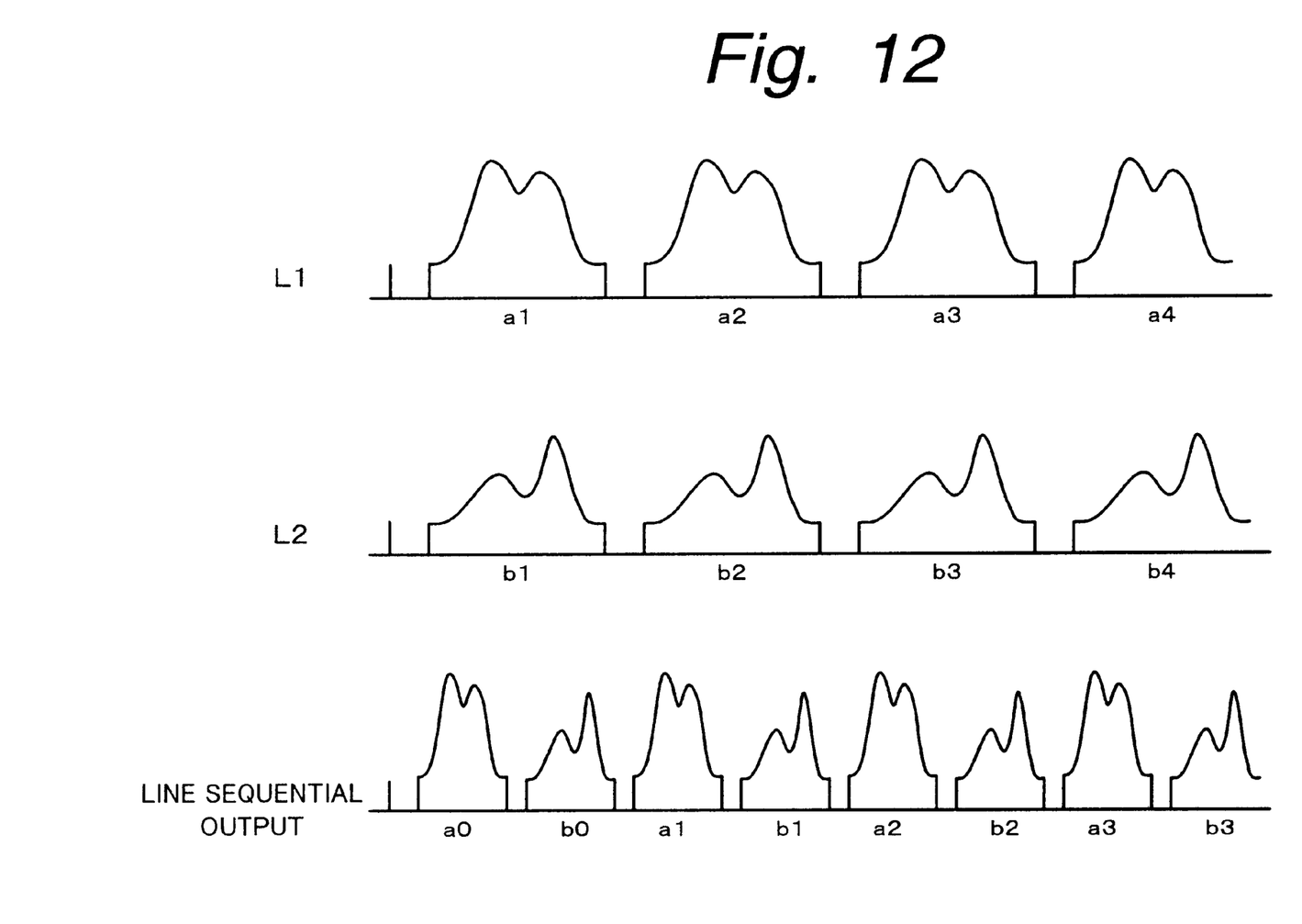
FIG. 12 is a schematic diagram showing waveforms for explaining a line sequential converting process.

FIG. 12 shows analog waveforms in the line double speed process. The estimation predictive calculating circuit 102 generates line data L1 and L2. The line data L1 contains lines a1, a2, a3, and so forth arranged in the order. The line data L2 contains lines b1, b2, b3, and so forth contained in the order. The line sequential converting circuit 109 compresses data of each line in the time axis direction by ½. The line sequential converting circuit 109 alternately selects the compressed data of each line and generates line sequential data (a0, b0, a1, b1, and so forth).

The output picture signal is supplied to a CRT displaying unit (not shown). The CRT displaying unit has a synchronizing system corresponding to the output picture signal (525$p$ signal). The input picture signal is a broadcast signal or a reproduction signal of a reproducing unit such as a VCR. The apparatus according to the embodiment of the present invention can be built in a television receiver.

Figure 13:
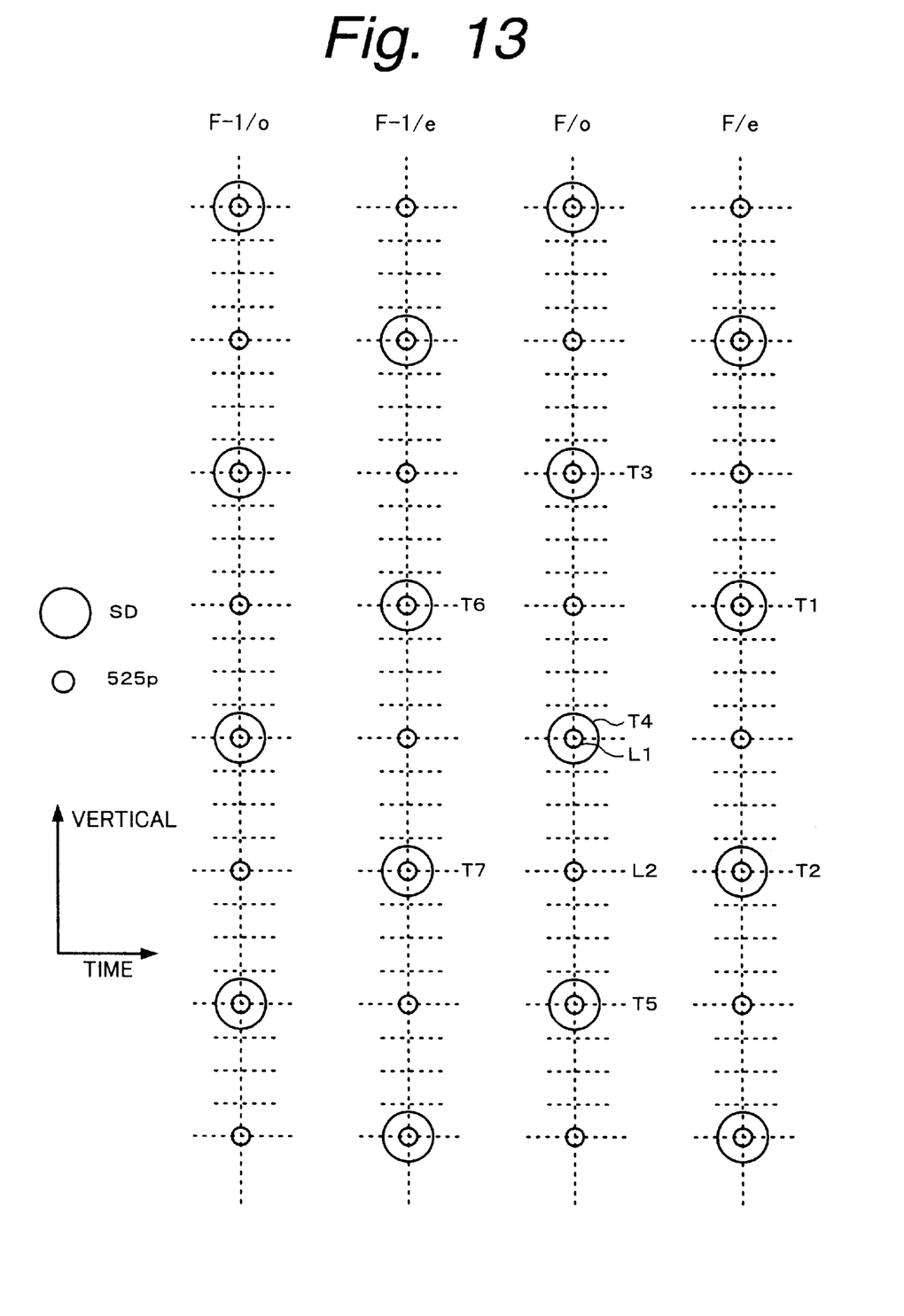
FIG. 13 is a schematic diagram showing the relation of positions of SD pixels and 525$p$ pixels and an example of spatial class taps.

FIG. 13 shows taps (SD pixels) selected by the second tap selecting circuit 103. FIG. 13 shows an arrangement of pixels in the vertical direction of an odd field of a frame F-1 (this field is denoted by F-1/o), an even field thereof (this field is denoted by F-1/e), an odd field of a frame F (this field is denoted by F/o), and an even field thereof (this field is denoted by F/e) that are chronologically sequential.

As shown in FIG. 13, spatial class taps for predicting line data L1 and line data L2 of the field F/o are input pixels T1 and T2, input pixels T3, T4, and T5, and input pixels T6 and T7. The input pixels T1 and T2 are contained in the field F/e and present spatially in the vicinity of pixels of the 525$p$ signal to be generated. The input pixels T3, T4, and T5 are contained in the field F/o and present in the vicinity of pixels of the 525$p$ signal to be generated. The input pixels T6 and T7 are contained in the field F-1/e. When the line data L1 and the line data L2 of the field F/e are predicted, likewise, taps are selected. In mode 1 for predicting pixels of the line data L1, the pixel T7 may not be selected as a class tap. In mode 2 for predicting pixels of the line data L2, the pixel T4 may not be selected as a class tap.

The motion determining apparatus according to the present invention is applied for the motion class detecting circuit 106. Thus, taps selected by the tap selecting circuit 104 (namely, motion class taps) are 50 SD pixels shown in FIG. 3. As described above, the last motion class MJ is determined. The determined class is supplied as a motion class to the class combining circuit 107.

Spatial class taps selected by the tap selecting circuit 103 are supplied to the spatial class detecting circuit 105. The spatial class detecting circuit 105 detects a pattern of a level distribution of the selected spatial class taps. In this case, the spatial class detecting circuit 105 compresses eight-bit SD data of each pixel to two-bit SD data. For example, the spatial class detecting circuit 105 compresses data of SD pixels as spatial class taps corresponding to ADRC (Adaptive Dynamic Range Coding) method. As information compressing means, another compressing means such as DPCM (predictive encoding method) or VQ (vector quantizing method) may be used instead of the ADRC method.

The ADRC method is an adaptively re-quantizing method developed for a high efficient encoding process for use with a VCR (Video Cassette Recorder). Since the ADRC method allows a local pattern of a signal level to be effectively represented with a short word length, according to the embodiment of the present invention, the ADRC method is used to generate a spatial class categorization code. In the ADRC method, the length between the maximum value MAX and the minimum value MIN is equally divided by a designated bit length and re-quantized corresponding to the following formula (1).

$$DR = MAX - MIN + 1$$

$$Q = \{(L - MIN + 0.5) \times 2 / DR\} \quad (1)$$

where DR represents the dynamic range of spatial class taps; L represents the data level of the pixel of each spacial class tap; Q represents a re-quantized code; and { } represents a truncating process.

By learning the relation between the pattern of a 525$i$ signal and the pattern of a 525$p$ signal, the obtained predictive coefficient for each class is stored to the predictive coefficient memory 108. The predictive coefficient is information for converting the 525$i$ signal into the 525$p$ signal corresponding to a linear estimation expression. The method for obtaining the predictive coefficient will be described later.

A predictive coefficient corresponding to a class is read from a relevant address of the coefficient memory 108. The predictive coefficient is supplied to the estimation predictive calculating circuit 102. The estimation predictive calculating circuit 102 calculates a liner combination expression (formula (2)) with predictive taps (pixel values) T1, T2, . . . , and Ti received from the tap selecting circuit 101 and predictive coefficients w1, w2, . . . , and wi and obtains line data L1 and L2. It should be noted that the predictive coefficient of the line data L1 is different from the predictive coefficient of the line data L2.

$$L1 = w1T1 + w2T2 + \ldots + wiTi \quad (2)$$

In such a manner, a predictive coefficient is pre-learnt for each class and stored to the predictive coefficient memory 108. Corresponding to predictive taps and predictive coefficients, output data corresponding to input data is calculated and output. Thus, unlike with an interpolating process for input data, a high quality progressive picture signal can be obtained.

Figure 14:
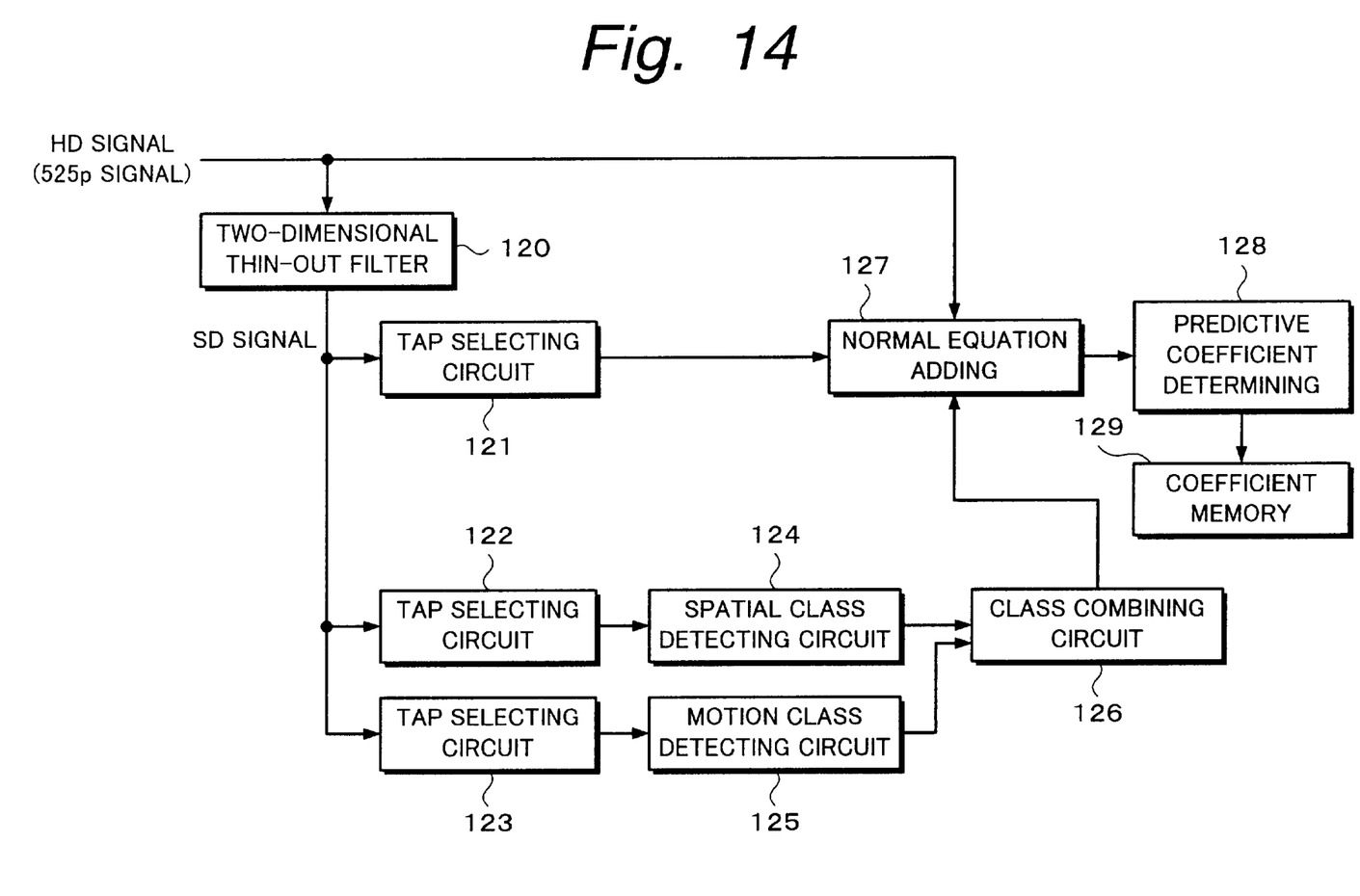
FIG. 14 is a block diagram showing an example of the structure for obtaining coefficient data.

Next, with reference to FIG. 14, a (learning) method for generating coefficient data stored in the coefficient memory 108 will be described. To learn coefficient data, an SD picture corresponding to a known HD picture (a 525$p$ signal) is generated by a two-dimensional thin-out filter 120 (in this case, the number of pixels of the SD picture is ¼ that of the HD picture). For example, pixels in the vertical direction of HD data are thinned out by a vertical thin-out filter so that the frequency in the vertical direction of the field is halved. In addition, pixels in the horizontal direction of HD data are thinned out by a horizontal thin-out filter.

An SD signal that is output from the two-dimensional thin-out filter 120 is supplied to a tap selecting circuit 121, a tap selecting circuit 122, and a tap selecting circuit 123. As with the tap selecting circuits 101, 103, and 104 of the signal converting apparatus shown in FIG. 10, the tap selecting circuits 121, 122, and 123 select predictive taps, spatial class taps, and motion taps, respectively. The predictive taps are supplied from the tap selecting circuit 121 to a normal equation adding circuit 127. The spatial class taps are supplied from the tap selecting circuit 122 to a spatial class detecting circuit 124. The motion class taps are supplied from the tap selecting circuit 123 to a motion class detecting circuit 125.

As with the spatial class detecting circuit 105 of the signal converting apparatus, the spatial class detecting circuit 124 compresses data of the spatial class taps corresponding to the ADRC method and generates a spatial class code. As with the motion class detecting circuit 106 of the signal converting apparatus, the motion class detecting circuit 125 generates a motion class code with the motion class taps. A class combining circuit 126 combines the spatial class code and the motion class code and generates a final class code. The final class code is supplied from the class combining circuit 126 to the normal equation adding circuit 127.

Next, to explain the operation of the normal equation adding circuit 127, a process for learning a conversion expression for converting a plurality of SD pixels into one HD pixel and a signal converting process using a prediction expression thereof will be described. First of all, for explaining the learning process, a predicting process using n pixels will be described. A liner estimation expression with n taps of coefficient data w1, . . . , and wn for each class is given by the formula (3). Before learning, wi is an undefined coefficient.

$$y = w1 \times 1 + w2 \times 2 + \ldots + wn \times n \quad (3)$$

where x1, x2, . . . , and xn represent levels of SD pixels selected as predictive taps; and y represents the level of an HD pixel.

A plurality of signals of data are learnt for each class. When the number of pieces of data is m, the following formula (4) is given corresponding to the formula (3).

$$yk = w1 \times k1 + k2 + \ldots + wn \times kn \quad (4)$$

where k=1, 2, . . . m.

In the case of m>n, since predictive coefficients wi, . . . , and wn are not uniquely given, elements of an error vector are defined by the following formula (5). A predictive coefficient that minimizes the solution of the formula (6) is obtained. In other words, least square method is used.

$$ek = yk - \{w1 \times k1 + w2 \times k2 + \ldots + wn \times kn\} \quad (5)$$

where k 1, 2, . . . , m.

$$e^2 = \sum_{k=0}^{m} e_k^2 \quad (6)$$

Next, a partial differential coefficient of the formula (6) with respect to wi is obtained. To do that, the coefficients wi are obtained so that the solution of the following formula (7) become "0".

$$\frac{\partial e^2}{\partial w_i} = \sum_{k=0}^{m} 2\left(\frac{\partial e_k}{\partial w_i}\right) e_k = \sum_{k=0}^{m} 2 x_{id} \cdot e_k \quad (7)$$

Next, when Xij and Yi are defined as the following formulas (8) and (9), the formula (7) can be represented as a matrix expressed by the following formula (10).

$$X_{ji} = \sum_{p=0}^{m} x_{pi} \cdot x_{pj} \quad (8)$$

$$Y_i = \sum_{k=0}^{m} x_{ki} \cdot y_k \quad (9)$$

$$\begin{bmatrix} x_{11} & x_{12} & \cdots & x_{1n} \\ x_{21} & x_{22} & \cdots & x_{2n} \\ \cdots & \cdots & \cdots & \cdots \\ x_{n1} & x_{n2} & \cdots & x_{nn} \end{bmatrix} \begin{bmatrix} w_1 \\ w_2 \\ \cdots \\ w_n \end{bmatrix} = \begin{bmatrix} Y_1 \\ Y_2 \\ \cdots \\ Y_n \end{bmatrix} \quad (10)$$

The formula (10) is generally referred to as normal equation. The normal equation adding circuit 127 shown in FIG. 14 performs the addition of the normal equation with class information received from the class combining circuit 126, predictive taps received from the tap selecting circuit 121, and pixels (a teacher signal) of a progressive picture to be generated.

After data of frames sufficient for the learning process has been input, the normal equation adding circuit 127 outputs normal equation data to the predictive coefficient determining portion 128. The predictive coefficient determining portion 128 solves the normal equation data with respect to wi using a conventional matrix solution such as sweep-out method and obtains predictive coefficients. The predictive coefficient determining portion 128 writes the obtained predictive coefficients to a predictive coefficient memory 129.

As a result of the learning process, predictive coefficients that allow values that are the statistically closest to the real value of the considered pixel Y of the progressive picture to be predicted for individual classes are stored to the predictive coefficient memory 129. The predictive coefficients stored in the predictive coefficient memory 129 are loaded to the predictive coefficient memory 108 of the picture signal converting apparatus.

Thus, the learning process for generating the progressive picture data with the interlace picture data corresponding to the linear estimation expression is completed.

Figure 15:
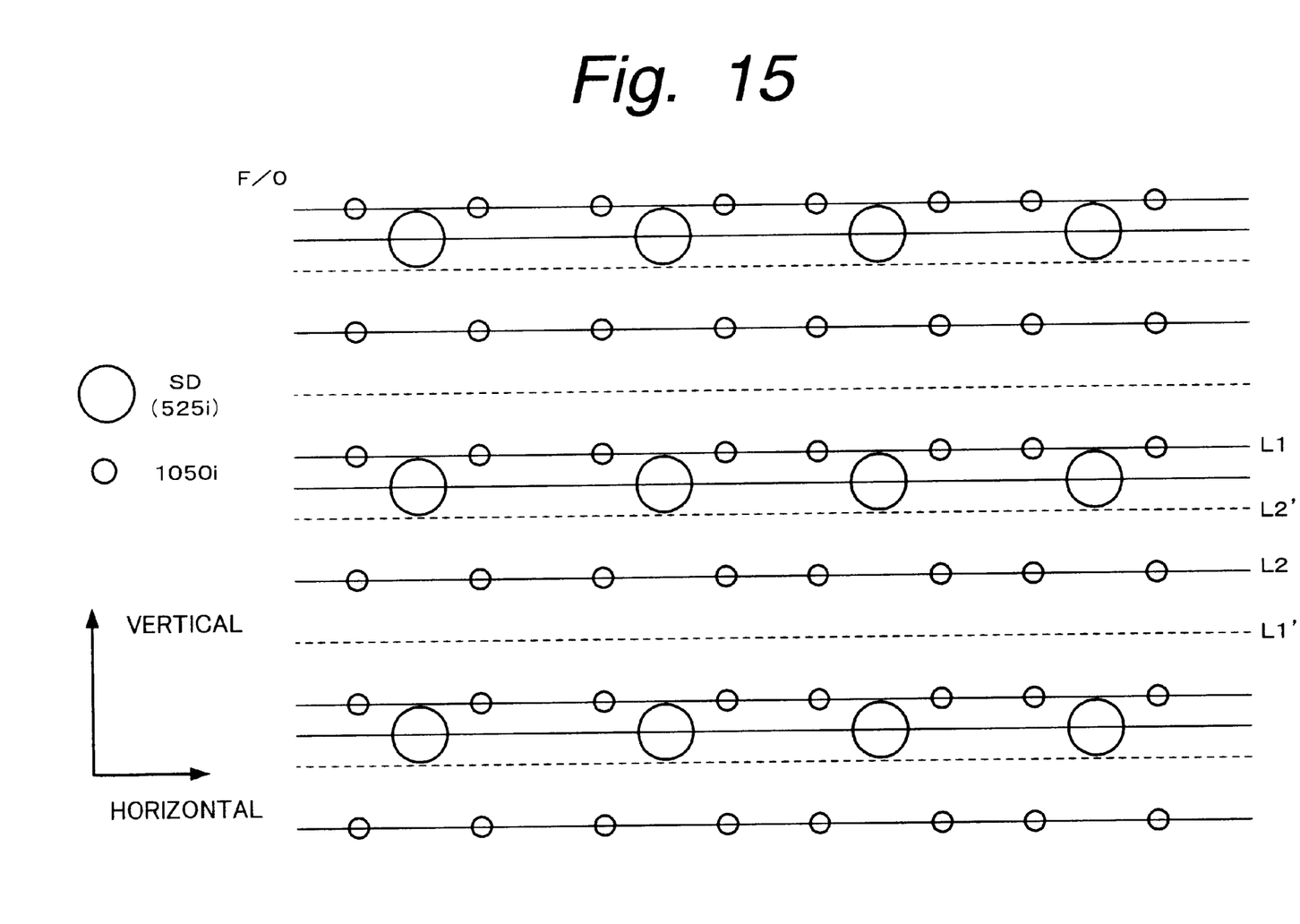
FIG. 15 is a schematic diagram for explaining the relation of positions of SD pixels and 1050$i$ pixels.

Although the number of scanning lines used in the apparatus according to the embodiment of the present invention is 525, however, it is an example. In other words, the present invention can be applied for an output picture signal with another scanning line structure. For example, as shown in FIG. 15, the present invention can be applied to a signal converting process for converting a 525*i* signal into a 1050*i* signal (a 1050-line interlace signal).

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A motion determining apparatus for detecting a motion of a partial picture of an input picture signal, comprising:
    first detecting means for detecting a frame difference of the partial picture;
    second detecting means for detecting a spatial activity of the partial picture;
    threshold value generating means for generating a first threshold value, a second threshold value, and a third threshold value;
    comparing means having at least a first comparing portion for comparing the frame difference detected by said first detecting means with the first threshold value and a second comparing portion for comparing the frame difference detected by said first detecting means with the second threshold value;
    third comparing means for comparing the spatial activity detected by said second detecting means with the third threshold value; and
    motion class determining means for receiving the compared results of said first comparing portion, said second comparing portion, and said third comparing means and determining the motion of the partial picture in at least three levels.

2. The motion determining apparatus as set forth in claim 1,
    wherein said motion class determining means determines that the motion class is the first motion class when the frame difference is larger than the first threshold value and the spatial activity is larger than the third threshold value, that the motion class is the second motion class when the motion class is not the first class and the frame difference is larger than the second threshold value, and that the motion class is the third motion class when the motion class is neither the first class nor the second class.

3. The motion determining apparatus as set forth in claim 1,
    wherein said threshold value generating means generates the first threshold value, the second threshold value, and the third threshold value that adaptively vary corresponding to the spatial activity.

4. The motion determining apparatus as set forth in claim 1,
    wherein a majority determining process is performed for the motion class determined by said motion class determining means.

5. A motion determining method for detecting a motion of a partial picture of an input picture signal, comprising the steps of:
    (a) detecting a frame difference of the partial picture;
    (b) detecting a spatial activity of the partial picture;
    (c) generating a first threshold value, a second threshold value, and a third threshold value;
    (d) comparing the frame difference detected by at step (a) with at least the first threshold value and the second threshold value;
    (e) comparing the spatial activity detected by step (b) with the third threshold value; and
    (f) receiving the compared results obtained at steps (d) and (e) and determining the motion of the partial picture in at least three levels.

6. A picture information converting apparatus for converting an input picture signal into a plurality of output picture signals with different scanning line structures, comprising:

first data selecting means for selecting a plurality of first pixels of the input picture signal, the positions of the first pixels being present in the vicinity of pixels of an output picture signal to be generated;

second data selecting means for selecting a plurality of second pixels of the input picture signal, the positions of the second pixels being present in the vicinity of pixels of an output picture signal to be generated;

third data selecting means for selecting a plurality of third pixels of the input picture signal, the positions of the third pixels being present in the vicinity of pixels of an output picture signal to be generated;

memory means for storing pre-obtained estimation expression coefficients;

signal generating means for generating pixels of an output picture signal with the plurality of first pixels selected by said first data selecting means and a linear estimation expression of the estimation expression coefficients;

class determining means for forming a spatial class corresponding to the plurality of second pixels selected by said second data selecting means, forming a motion class corresponding to the plurality of third pixels selected by said third data selecting means, and supplying the estimation coefficients to said signal generating means corresponding to class information as a combination of the spatial class and the motion class;

scanning line structure converting means, connected to said signal generating means, for converting the input picture signal into an output picture signal with a designated scanning line structure; and a motion determining portion for forming the motion class, wherein said motion determining portion has:

first detecting means for detecting a frame difference of the partial picture composed of the plurality of third pixels;

second detecting means for detecting a spatial activity of the partial picture;

threshold value generating means for generating a first threshold value, a second threshold value, and a third threshold value;

comparing means having at least a first comparing portion for comparing the frame difference detected by said first detecting means with the first threshold value and a second comparing portion for comparing the frame difference detected by said first detecting means with the second threshold value;

third comparing means for comparing the spatial activity detected by said second detecting means with the third threshold value; and motion class determining means for receiving the compared results of said first comparing portion, said second comparing portion, and said third comparing means and determining the motion of the partial picture in at least three levels.

7. The picture information converting apparatus as set forth in claim 6, wherein a progressive output picture signal is generated with an interlace input picture signal.

8. The picture information converting apparatus as set forth in claim 6, wherein an output picture signal of which the number of pixels in the vertical direction is twice as many as that of the input picture signal is generated.

9. The picture information converting apparatus as set forth in claim 6, wherein the prediction coefficients are pre-learnt so that the error between a generated value and the true value of each of the pixels becomes minimum when pixels of an output picture signal are generated corresponding to the linear estimation expression.

* * * * *